United States Patent
Ro et al.

(10) Patent No.: US 12,003,597 B2
(45) Date of Patent: Jun. 4, 2024

(54) METHOD FOR DETECTING UNAUTHORIZED COPYING OF CONTENT AND SERVICE SERVER USING SAME

(71) Applicant: NAVER WEBTOON LTD., Seongnam-si (KR)

(72) Inventors: Inwoo Ro, Seongnam-si (KR); Choong Hyun Seo, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 350 days.

(21) Appl. No.: 17/451,877

(22) Filed: Oct. 22, 2021

(65) Prior Publication Data

US 2022/0043889 A1 Feb. 10, 2022

Related U.S. Application Data

(63) Continuation of application No. PCT/KR2020/003875, filed on Mar. 20, 2020.

(30) Foreign Application Priority Data

Apr. 23, 2019 (KR) .................. 10-2019-0047429

(51) Int. Cl.
*H04L 67/50* (2022.01)
*G06F 21/10* (2013.01)

(52) U.S. Cl.
CPC ........ *H04L 67/535* (2022.05); *G06F 21/1078* (2023.08)

(58) Field of Classification Search
CPC ...... G06F 21/10; G06F 21/1078; G06F 21/55; H04L 67/535; G11B 20/00; G06Q 50/10
See application file for complete search history.

(56) References Cited

U.S. PATENT DOCUMENTS

| 2009/0025089 | A1* | 1/2009 | Martin | G06F 21/31 726/28 |
| 2014/0125692 | A1 | 5/2014 | Cheon et al. | |
| 2014/0298251 | A1* | 10/2014 | Ohtsuka | G06F 3/04883 715/784 |

(Continued)

FOREIGN PATENT DOCUMENTS

| JP | 2011250217 A | 12/2011 |
| JP | 2015219816 A | 12/2015 |

(Continued)

OTHER PUBLICATIONS

Office Action issued in corresponding JP application No. 2021-562915, dated Jan. 10, 2023.

(Continued)

*Primary Examiner* — Techane Gergiso
(74) *Attorney, Agent, or Firm* — Greer Burns & Crain Ltd.

(57) ABSTRACT

A method for detecting an unauthorized copy of a content according to an embodiment of the present invention includes providing content including a plurality of images to a terminal device; collecting scroll inputs applied by a user to the terminal device when viewing the content, and generating scroll log information from the scroll inputs; and constructing a database by collecting the scroll log information according to each user account registered in the service server or identification information of the terminal device.

15 Claims, 10 Drawing Sheets

(56) References Cited

U.S. PATENT DOCUMENTS

| | | | |
|---|---|---|---|
| 2015/0095848 A1* | 4/2015 | Sugimoto | G06F 3/0485 |
| | | | 715/784 |
| 2016/0014284 A1 | 1/2016 | Ko et al. | |
| 2017/0075538 A1 | 3/2017 | Park et al. | |
| 2018/0067940 A1 | 3/2018 | Shin et al. | |
| 2018/0336578 A1 | 11/2018 | Sato et al. | |
| 2019/0236654 A1* | 8/2019 | Clinger | H04L 63/101 |

FOREIGN PATENT DOCUMENTS

| | | |
|---|---|---|
| JP | 2016053809 A | 4/2016 |
| JP | 2017045409 A | 3/2017 |
| JP | 2018195024 A | 12/2018 |
| KR | 101531404 B1 | 6/2015 |
| KR | 1020160007917 A | 1/2016 |
| KR | 1020170032759 A | 3/2017 |
| KR | 1020180027278 A | 3/2018 |
| KR | 101893093 B1 | 8/2018 |

OTHER PUBLICATIONS

Office action issued in Korean patent application No. 10-2019-0047429, dated Jun. 18, 2020.
ISR issued in PCT/KR2020/003875, mailed Jul. 2, 2020.
Notice of Allowance issued in corresponding JP application No. 2021-562915, dated Apr. 25, 2023.

* cited by examiner

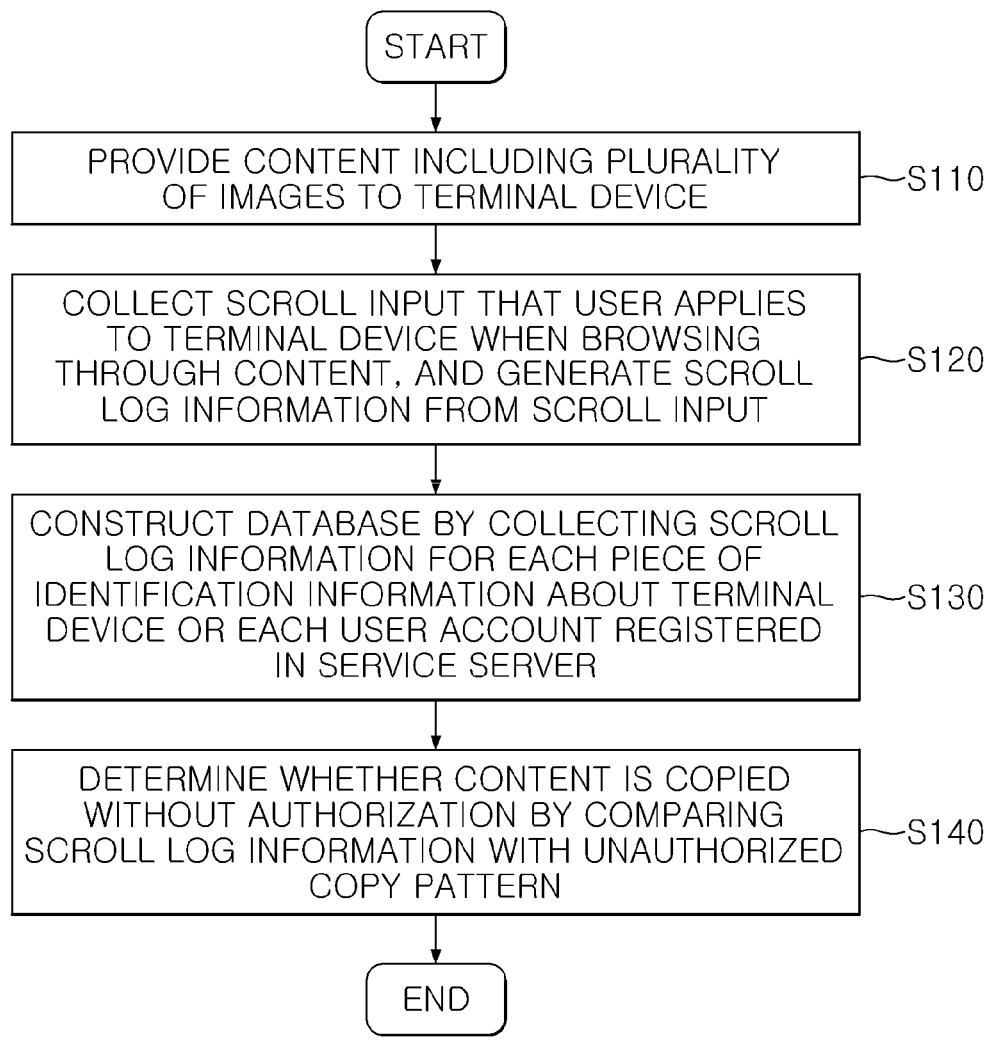

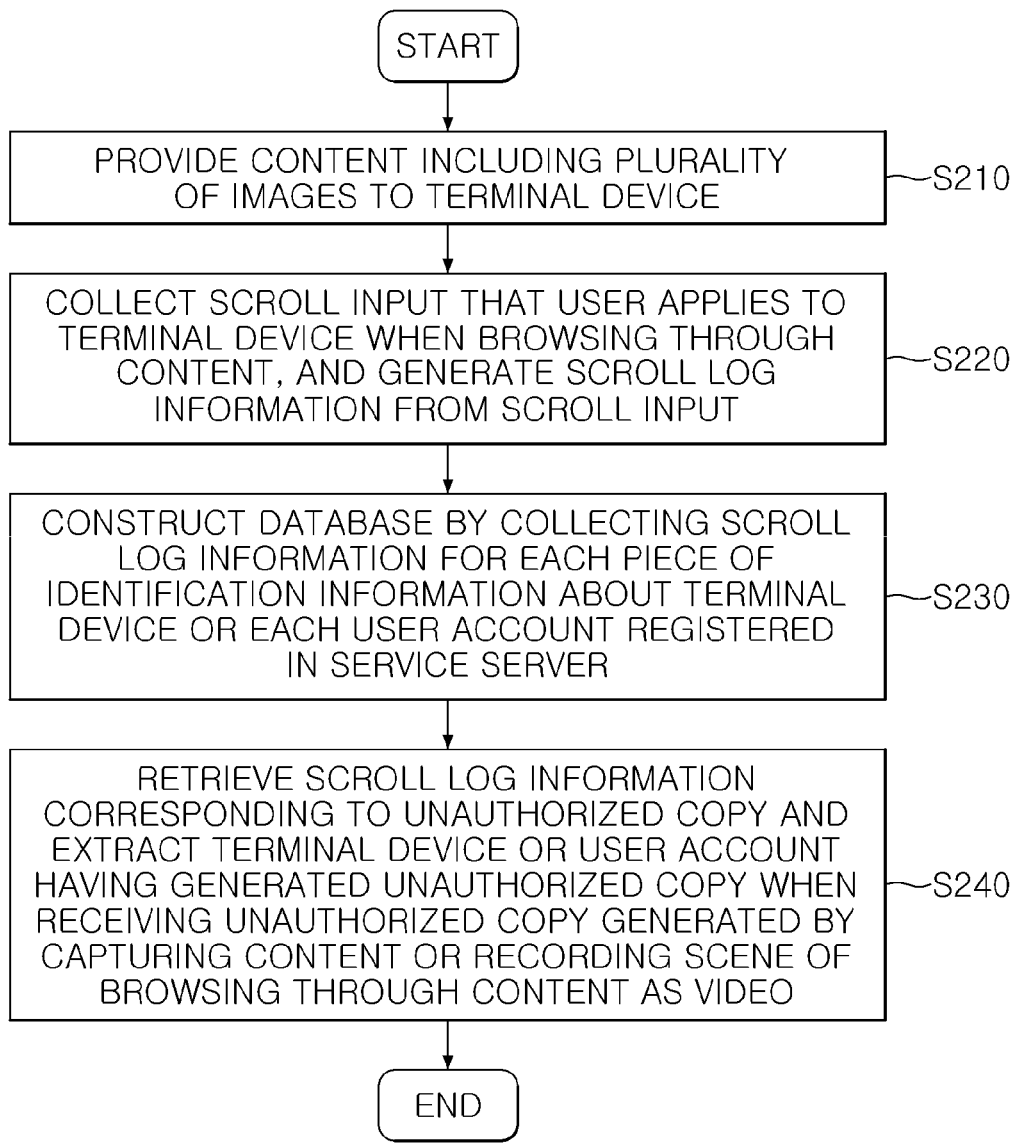

METHOD FOR DETECTING UNAUTHORIZED COPYING OF CONTENT AND SERVICE SERVER USING SAME

CROSS-REFERENCE TO RELATED APPLICATIONS

This is a continuation application of International Application No. PCT/KR2020/003875, filed Mar. 20, 2020, which claims the benefit of Korean Patent Application No. 10-2019-0047429, filed Apr. 23, 2019.

BACKGROUND OF THE INVENTION

Field of Invention

The present disclosure relates to a method for detecting unauthorized copying of content and a service server using the same and, more particularly, to a method and a service server which are capable of detecting unauthorized copying of content by comparing a scroll log of a user with an unauthorized copy pattern.

Description of Related Art

Currently, functions of posting and sharing content online through a network are widely used, and accordingly, copyright holders who create and distribute content upload and distribute content through various portal sites, and users can easily obtain various kinds of content products online.

However, as it becomes easier to obtain content online, copying of content online becomes easier and, accordingly, illegal cases of producing duplicate content by capturing content posted on a portal site or by scanning the content using a scan tool and illegally distributing the duplicated content online are significantly increasing in frequency.

Accordingly, not only the rights of copyright holders are indiscriminately infringed but users who subscribe to content by properly paying for a product also suffer damage.

Among pieces of contents, online comics content, such as webtoons, is one of the most popular types of content, and thus illegal duplication thereof is rampant. Accordingly, technology for identifying and preventing illegally copied content by applying various techniques is emerging to prevent illegal duplication of online comics content.

BRIEF SUMMARY OF THE INVENTION

The present application provides a method for detecting unauthorized copying of content and a service server using the same which are capable of detecting a user producing an unauthorized copy by comparing a scroll log of the user with the unauthorized copy pattern.

The present application provides a method for detecting unauthorized copying of content and a service server using the same which are capable of detecting and warning a user that performs unauthorized copying in real time by comparing a scroll log of the user with an unauthorized copy pattern.

A method, performed a service server, for detecting unauthorized copying of content according to an embodiment of the present disclosure may include: providing content including a plurality of images to a terminal device; collecting a scroll input applied by a user to the terminal device when browsing through the content, and generating scroll log information from the scroll input; and constructing a database by collecting the scroll log information according to each piece of identification information about the terminal device or each user account registered in the service server.

A service server according to an embodiment of the present disclosure may include: a content providing unit configured to provide content including a plurality of images to a terminal device; a scroll log information generation unit configured to collect a scroll input applied by a user to the terminal device when browsing through the content and to generate scroll log information from the scroll input; and a storage unit configured to collect and store the scroll log information according to each piece of identification information about the terminal device or each user account registered in the service server.

The foregoing solutions do not illustrate all features of the present disclosure. Various features of the present disclosure and advantages and effects thereof may be understood in more detail with reference to the following specific embodiments.

According to a method for detecting unauthorized copying of content and a service server using the same according to an embodiment of the present disclosure, it is possible to detect a user producing an unauthorized copy by comparing the unauthorized copy with each scroll log. Here, the scroll log corresponds to a scroll input applied by a user when browsing through content, making it possible to easily specify an unauthorized copier without including a separate mark in the content.

According to a method for detecting unauthorized copying of content and a service server using the same according to an embodiment of the present disclosure, it is possible to determine whether a user performs unauthorized copying by analyzing a scroll log of the user in real time or at a later time. Therefore, it is possible to transmit a warning message to the user or to stop providing content for the user when it is determined that the user is performing unauthorized copying.

The effects obtainable by a method for detecting unauthorized copying of content and a service server using the same according to embodiments of the present disclosure are not limited to the effects mentioned above, and other effects not mentioned will be clearly understood by those skilled in the art from the following description.

BRIEF DESCRIPTION OF THE DRAWINGS

FIG. 6 is a flowchart illustrating a method for detecting unauthorized copying of content according to an embodiment of the present disclosure; and FIG. 7 and FIGS. 8A and 8B are flowcharts illustrating a method for detecting unauthorized copying of content according to another embodiment of the present disclosure.

DETAILED DESCRIPTION OF THE INVENTION

Figure 1:
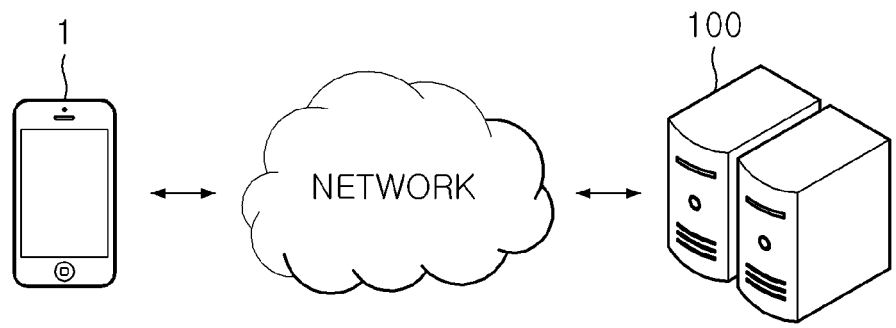
FIG. 1 is a schematic diagram illustrating a system for detecting unauthorized copying of content according to an embodiment of the present disclosure.

Hereinafter, embodiments disclosed herein will be described in detail with reference to the accompanying drawings, in which like or similar elements are denoted by like reference numerals regardless of drawing numerals and redundant descriptions thereof will be omitted. As used herein, the terms "module" and "unit" for components are given or interchangeably used only for ease in writing the specification and do not themselves have distinct meanings or functions. That is, the term "unit" used herein refers to software or a hardware component, such as FPGA or ASIC, and a "unit" performs certain functions. However, a "unit" is not limited to software or hardware. A "unit" may be configured to be in an addressable storage medium or may be configured to execute one or more processors. Thus, in one example, a "unit" may include components, such as software components, object-oriented software components, class components, and task components, processes, functions, properties, procedures, subroutines, segments of a program code, drivers, firmware, a microcode, circuitry, data, a database, data structures, tables, arrays, and variables. Functions provided in components and "units" may be combined into a smaller number of components and "units" or may be further divided into additional components and "units".

When detailed descriptions about related known technology are determined to make the gist of embodiments disclosed herein unclear in describing the embodiments disclosed herein, the detailed descriptions will be omitted herein. In addition, it should be understood that the accompanying drawings are only for easy understanding of the embodiments disclosed herein, and technical ideas disclosed herein are not limited by the accompanying drawings but include all modifications, equivalents, or substitutes included in the spirit and technical scope of the present disclosure.

FIG. 1 schematically illustrates a system for detecting unauthorized copying of content according to an embodiment of the present disclosure.

Referring to FIG. 1, the system for detecting unauthorized copying of content according to the embodiment of the present disclosure may include a terminal device 1 and a service server 100.

Hereinafter, the system for detecting unauthorized copying of content according to the embodiment of the present disclosure is described with reference to FIG. 1.

The terminal device 1 may execute various types of applications and may provide an application being executed for a user by visually or audibly displaying the application. The terminal device 1 may include a display to visually display an application and may include an input unit to receive a user input, a communication unit, a memory to store at least one program, and a processor.

The terminal device 1 may be a mobile terminal, such as a smartphone or a tablet PC, and may also include a fixed device, such as a desktop, according to an embodiment. Specifically, the terminal device 1 may include a mobile phone, a smartphone, a laptop computer, a digital broadcasting terminal, a personal digital assistant (PDA), a portable multimedia player (PMP), a slate PC, a tablet PC, an Ultrabook, a wearable device, (e.g., a watch-type terminal (smartwatch), a glass-type terminal (smart glasses), and a head-mounted display (HMD)), and the like.

The terminal device 1 may access the App Store or the Play Store to download and install various applications. According to an embodiment, it is also possible to download an application through wired or wireless communication with the service server 100 or a different device (not shown).

Here, an application may be a web browser application that outputs content, such as webtoons, web novels, games, news, images, sounds, and videos provided online, or a dedicated application for providing content in a specific field.

The terminal device 1 may be connected to the service server 100 through a communication network. The communication network may include a wired network and a wireless network, and specifically, various networks, such as a local area network (LAN), a metropolitan area network (MAN), a wide area network (WAN). The communication network may also include the well-known World Wide Web (WWW). However, the communication network according to the present disclosure is not limited to the networks listed above and may include a well-known wireless data network, a well-known telephone network, a well-known wired or wireless television network, and the like.

The service server 100 may be connected to the terminal device 1 through an application and may provide various types of content, such as webtoons, web novels, games, news, images, sounds, and videos, in response to a request from the terminal device 1. The service server 100 may be a computing device having one or more processors configured to execute instructions of a computer program, a memory for storing computer programs, a communication interface for enabling the service server to communicatively connect to the network, and an input/output interface for connecting with input/output devices such as a display panel, a keyboard, a mouse, etc.

According to an embodiment, it is also possible for the service server 100 to provide a dedicated service for providing content in a specific field, such as a webtoon or a web novel. That is, the service server 100 may provide content, such as a webtoon or a web novel, to each terminal device 1 in response to a request from the user, and the webtoon or the web novel may include a plurality of images.

Generally, since the entire webtoon or the web novel is not displayed at once on the terminal device 1, the user may scroll through the webtoon or the web novel on the terminal device 1 to sequentially view the entire content.

Here, some users may perform unauthorized copying of the webtoon or web novel using a capture function or a video recording function of the terminal device 1 and may arbitrarily change the webtoon or the web novel or illegally distribute the webtoon or the web novel. Although these actions correspond to infringements of the copyright of the content, the nature of digital media that can be easily copied and distributed makes it difficult to detect unauthorized copying by a user or to find a distributor.

However, the service server 100 according to an embodiment of the present disclosure can extract each user who has produced an unauthorized copy and can detect whether a user who views content is performing unauthorized copying. Hereinafter, the service server 100 according to an embodiment of the present disclosure will be described.

Figure 2:
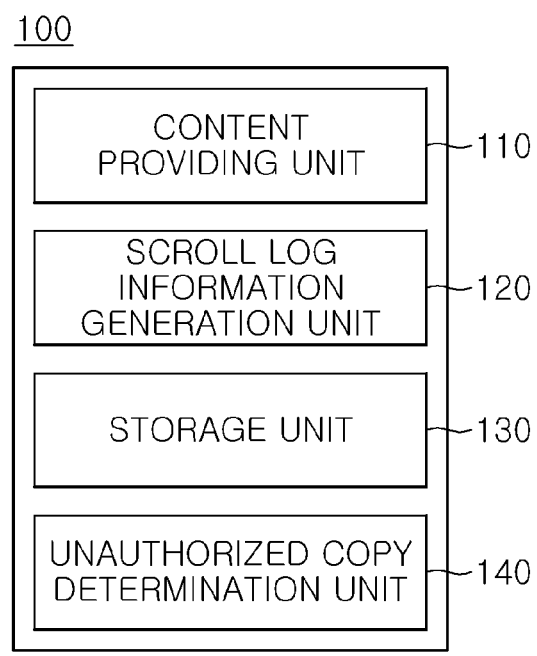
FIG. 2 is a block diagram illustrating a service server according to an embodiment of the present disclosure.

FIG. 2 is a block diagram illustrating a service server according to an embodiment of the present disclosure.

Referring to FIG. 2, the service server 100 according to the embodiment of the present disclosure may include a content providing unit 110, a scroll log information generation unit 120, a storage unit 130, and an unauthorized copy determination unit 140. In one embodiment, these units 110, 120, 130, 140 of the service server 100 may be implemented as functions of one or more processors, executed in accordance with corresponding program instructions stored in the memory of the service server 100.

Hereinafter, the service server 100 according to the embodiment of the present disclosure is described with reference to FIG. 2.

Figure 3A:
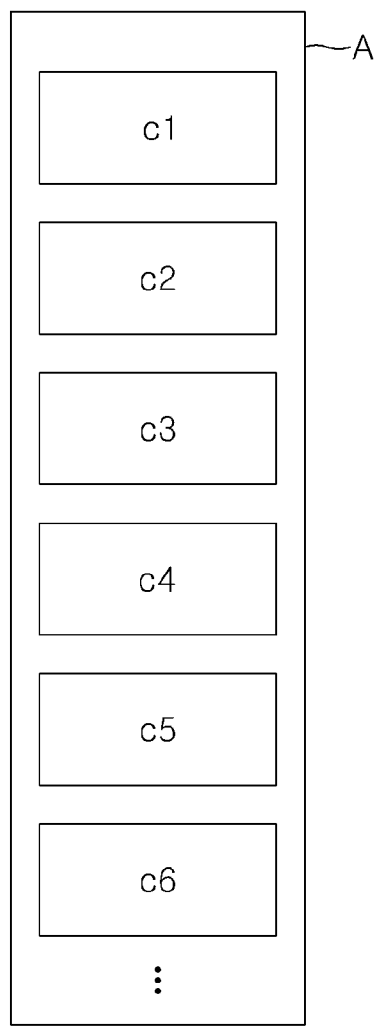
FIGS. 3A and 3B schematically illustrate a display of content according to an embodiment of the present disclosure.

The content providing unit 110 may provide content including a plurality of images to the terminal device 1. The content providing unit 110 may provide various types of content to the terminal device 1, and may provide pieces of content including a plurality of images, such as a webtoon or a web novel, according to an embodiment. A webtoon may include cut images including a picture and a line showing each scene, and a web novel may include page images including text or an illustration. Here, pieces of content A, such as a webtoon or a web novel, may be formed by vertically connecting a plurality of images c1 to c6 as illustrated in FIG. 3A.

Figure 3B:
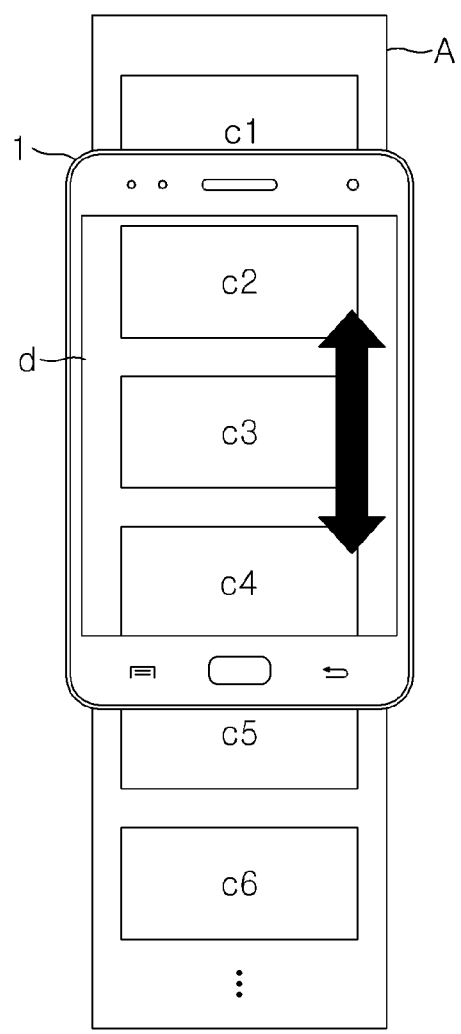

In this case, as illustrated in FIG. 3B, since only some images c2, c3, and c4 of content A are displayed on the terminal device 1, a user may apply a scroll input to the terminal device to browse through entire content A. That is, the user may sequentially identify individual images c1 to c6 included in content A by scrolling content A up and down, thereby browsing through content A.

The content providing unit 110 may provide content only for a user that has been registered in the service server 100 and has created a user account. That is, the content providing unit 110 may provide content to the terminal device 1 of the user that has logged into the service server 100, in which case the content providing unit 110 may specify the user that has browsed through the content through the user account of the user that has logged in.

Further, according to an embodiment, it is also possible to provide content to a user that has not been registered in the service server 100 or has not logged in. In this case, the content providing unit 110 may distinguish each terminal device 1 using identification information about the terminal device 1 connected to the service server 100. For example, the content providing unit 110 may collect identification information, such as an Internet protocol (IP) address, a media access control (MAC) address, and international mobile station identity (IMSI) information, from the terminal device 1 connected to the service server 100 and may distinguish each terminal device 1 using the identification information. That is, the content providing unit 110 may specify a user that has browsed through the content using the identification information about the terminal device 1.

The scroll log information generation unit 120 may collect a scroll input that the user applies to the terminal device when browsing through content, and may generate scroll log information from the scroll input.

Figure 4A:
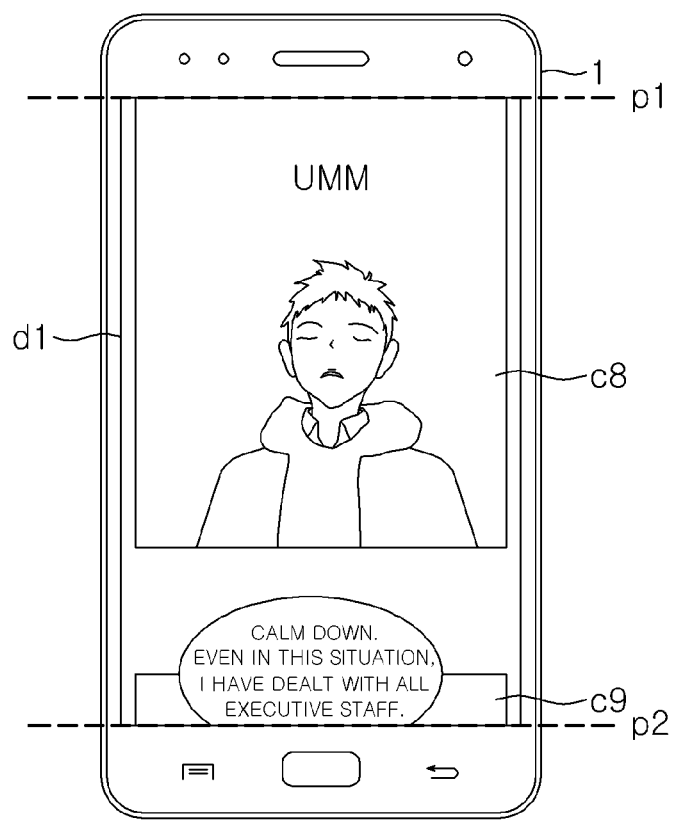
FIGS. 4A and 4B schematically illustrates a display area of content according to an embodiment of the present disclosure.
Figure 4B:
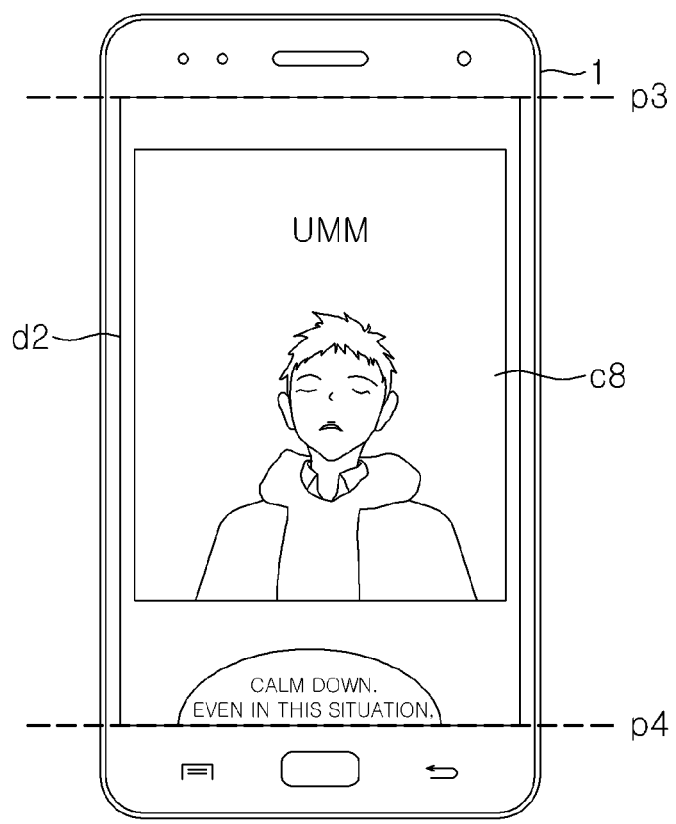

In general, a user browsing through content, such as a webtoon, may apply a scroll input so that individual images included in the webtoon are sequentially displayed on the terminal device 1, and may stop scrolling for a certain time to identify a detail included in an image. Here, as illustrated in FIG. 4A and FIG. 4B, even when identifying same image c8, individual users may stop scrolling at different positions p1-p2 and p3-p4. That is, it is possible to distinguish the individual users browsing through the content by comparing positions at which scrolling is stopped for each image, in which case as the number of images included in the content increases, it is possible to distinguish a larger number of users. Therefore, scroll log information generated from a scroll input applied by a user when browsing through content may be formed differently for each user, and it is possible to distinguish each user using scroll log information.

Specifically, the scroll log information includes position coordinate information indicating a display area of content being displayed on the terminal device 1 by a scroll input and display time information indicating a time at which each display area is displayed on the terminal device 1. The display time information may include the display start time, the display end time, and the display duration of each display area.

When content supports vertical scrolling, as illustrated in FIGS. 4A and 4B, the uppermost coordinate values p1 and p3 and the lowermost coordinate values p2 and p4 of display areas d1 and d2 may be used as position coordinate information. Here, position coordinate values in a vertical direction from the start point of the content to the end point thereof may be predetermined, and the uppermost coordinate value and the lowermost coordinate value of each of the display areas d1 and d2 may be set using the position coordinate values. According to an embodiment, it is also possible to utilize the pixel coordinate values of pixels included in content A.

Figure 5:
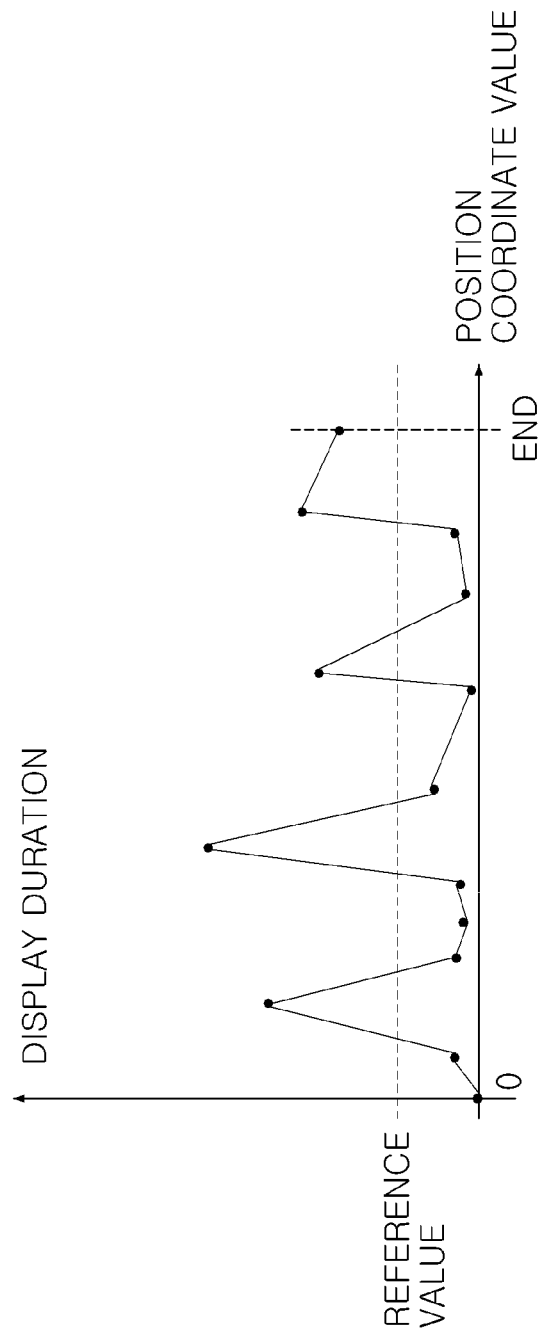
FIG. 5 is a graph illustrating scroll log information according to an embodiment of the present disclosure.

The display areas d1 and d2 may be continuously set according to a scroll input, and according to an embodiment, as illustrated in FIG. 5, it is also possible to set an area displayed on the terminal device 1 as effective display areas d1 and d2 when display duration in which scrolling remains stopped is a reference value or greater. That is, only the effective display areas of all display areas may be included in the scroll log information. In FIG. 5, a horizontal axis may denote a position coordinate value from the start point of the content to the end point thereof, and a vertical axis may denote display duration in which each position coordinate value is displayed on the terminal device 1.

In addition, the scroll log information may further include content identification information indicating content and a unique number indicating each image displayed in a display area. Here, the content identification information may include content-specific information for distinguishing each piece of content and episode information indicating each episode included in a series when the content is presented in a series. Further, a unique number may be preset for all images included in the content, and the scroll log information may include a unique number corresponding to each image included in a display area.

The storage unit 130 may construct a database by collecting scroll log information for each piece of identification information about the terminal device 1 or each user account registered in the service server 100. That is, when a user is registered in the service server 100 and has a user account, the storage unit 130 may collect and store each piece of scroll log information for each user account in the database.

However, when a user is not registered in the service server 100 or is provided with content without logging into the service server 100, a user account may not exist or it may be impossible to identify a user account. In this case, the storage unit 130 may collect and store scroll log information for each piece of identification information about the terminal device 1 instead of a user account. Each terminal device 1 includes identification information, such as an IP address, a MAC address, and IMSI information, and may provide the identification information to the service server 100 when communicating with the service server 100. Accordingly, the storage unit 130 may store scroll log information for each piece of identification information about the terminal device 1 instead of a user account.

In addition, the storage unit 130 may analyze, using the scroll log information, a pattern of a scroll input performed by each user when browsing through content. A user that performs unauthorized copying of content intends to capture an image or record a video such that each image is clearly shown and may thus stop scrolling at different positions or time intervals from those of normal or authorized users who do not copy the contents. Therefore, the storage unit 130 may extract a scroll input pattern of users that perform unauthorized copying through a pattern analysis of a scroll input.

Specifically, the storage unit 130 may collect scroll log information at the time of generating an unauthorized copy from a user account or a terminal device 1 detected to have generated the unauthorized copy. Subsequently, machine learning may be performed using the collected scroll log information as a sample, and an unauthorized copy pattern corresponding to a scroll input performed when generating an unauthorized copy may be extracted through machine learning.

The unauthorized copy determination unit 140 may determine whether content is copied without authorization by comparing scroll log information with an unauthorized copy pattern. That is, the unauthorized copy determination unit 140 may identify scroll log information applied by each user in real time or at a later time and may calculate the similarity between the scroll log information and an unauthorized copy pattern. Here, when the similarity is a set value or greater, the unauthorized copy determination unit 140 may determine that a user has performed unauthorized copying, in which case the unauthorized copy determination unit 140 may transmit a warning message for warning of unauthorized copying to the terminal device 1 or the user account. According to an embodiment, it is also possible to stop providing content for the terminal device 1 or the user account.

An administrator of the service server 100 may collect unauthorized copies circulated online and may input the collected unauthorized copies to the unauthorized copy determination unit 140. In this case, the unauthorized copy determination unit 140 may extract a user account or a terminal device 1 that has generated an unauthorized copy and may provide the same to the administrator. Here, the unauthorized copy circulated online may have been generated by capturing content provided by the content providing unit 110 or recording a video.

First, when an unauthorized copy is generated by capturing content, a plurality of captured images may be included in the unauthorized copy, and the unauthorized copy determination unit 140 may extract a capture position corresponding to each captured image from the registered content. Here, the capture position may be expressed as position coordinate information on the content, and may also be expressed as a pixel coordinate value of the content according to an embodiment. Subsequently, the unauthorized copy determination unit 140 may compare the capture position with the scroll log information, thereby extracting a terminal device 1 or a user account that has stopped scrolling at the capture position.

Here, the unauthorized copy determination unit 140 may extract the terminal device 1 or the user account having stopped scrolling at positions that match capture positions corresponding to all captured images by a set percentage or greater. Capture positions and positions at which scrolling is stopped may coincide with each other in one or two images, but it is almost stochastically impossible that capture positions and positions at which scrolling is stopped coincide with each other in a set percentage (e.g., 80 to 90%) of images or greater among all of the images. Accordingly, the unauthorized copy determination unit 140 may determine and extract, as an unauthorized copier, the terminal device 1 or the user account having stopped scrolling at positions that match the capture positions of the unauthorized copy by the set percentage or greater.

In addition, when an unauthorized copy is generated by recording a scene while browsing through the content of a video, specific display areas displayed when the scrolling of the content is stopped by a reference value or greater may be first extracted from the scene of the content included in the unauthorized copy. Subsequently, a scrolling stop position on the content corresponding to each specific display area may be extracted, and a terminal device 1 or a user account having stopped scrolling at the scrolling stop position may be extracted by comparing the scrolling stop position with the scroll log information. Here, the scrolling stop position may be expressed as position coordinate information on the content, and may also be expressed as a pixel coordinate value of the content according to an embodiment. Here, the unauthorized copy determination unit 140 may extract a terminal device 1 or a user account having stopped scrolling at positions that match all scrolling stop positions of the video by a set percentage or greater.

FIG. 6 is a flowchart illustrating a method for detecting unauthorized copying of content according to an embodiment of the present disclosure.

Referring to FIG. 6, the method for detecting unauthorized copying of content according to the embodiment of the present disclosure may include a content providing operation (S110), a scroll log information generation operation (S120), a database construction operation (S130), and an unauthorized copy determination operation (S140). Here, each operation may be performed by the service server 100.

Hereinafter, the method for detecting unauthorized copying of content according to the embodiment of the present disclosure is described with reference to FIG. 6.

In the content providing operation (S110), the service server 100 may provide content including a plurality of images to the terminal device 1. The service server 100 may provide various types of content to the terminal device 1, and may provide content including a plurality of images, such as a webtoon or a web novel, according to an embodiment. Here, only some images of the content may be displayed on the terminal device 1, and a user may apply a scroll input to the terminal device 1 to browse through the entire content. That is, the user may sequentially identify the individual images included in the content by scrolling the content up and down, thereby browsing through the content.

In the content providing operation (S110), the service server 100 may provide the content for a user that has been registered and has created a user account, in which case the service server 100 may specify the user that has browsed through the content through the user account of the user that has logged in. According to another embodiment, it is also possible to provide the content to a user that has not been registered in the service server 100 or has not logged in, in which case the service server 100 may specify a terminal device 1 browsing through the content using identification information about the terminal device 1 connected to the service server 100. For example, the service server 100 may collect identification information, such as an Internet protocol (IP) address, a media access control (MAC) address, and international mobile station identity (IMSI) information, from the terminal device 1 connected to the service server 100 and may distinguish each terminal devices 1 using the identification information.

In the scroll log information generation operation (S120), the service server 100 may collect a scroll input that the user applies to the terminal device 1 when browsing through the content, and may generate scroll log information from the scroll input.

Here, when the content includes a plurality of images, individual users may stop scrolling at different positions to identify each image. That is, it is possible to distinguish the individual users browsing through the content by comparing positions at which scrolling is stopped for each image. Accordingly, it is possible to distinguish each user using scroll log information generated from a scroll input applied by the user when browsing through the content.

Specifically, the scroll log information includes position coordinate information indicating the display area of content being displayed on the terminal device 1 by a scroll input and display time information indicating the time at which each display area is displayed on the terminal device 1. The display time information may include the display start time, the display end time, and the display duration of each display area.

When the content supports vertical scrolling, the uppermost coordinate value and the lowermost coordinate value of a display area may be used as position coordinate information. Here, position coordinate values in the vertical direction from the start point of the content to the end point thereof may be predetermined, and the uppermost coordinate value and the lowermost coordinate value of each display area may be set using the position coordinate values. According to an embodiment, a display area having a display duration of a reference value or greater among a plurality of display areas may be set as an effective display area, and position coordinate information and display time information corresponding to the effective display area may be included in the scroll log information.

In addition, the scroll log information may further include content identification information indicating the content and a unique number indicating each image displayed in a display area. Here, the content identification information may include content-specific information for distinguishing each piece of content and episode information indicating each episode included in a series when the content is presented as a series. Further, a unique number may be preset for all images included in the content, and the scroll log information may include a unique number corresponding to each image included in a display area.

In the database construction operation (S130), the service server 100 may construct a database by collecting scroll log information for each piece of identification information about the terminal device 1 or each user account registered in the service server 100.

That is, when the user is registered in the service server 100 and has a user account, the service server 100 may collect and store each piece of scroll log information for each user account. However, when the user is not registered in the service server 100 or is provided with the content without logging into the service server 100, the service server 100 may collect and store scroll log information for each piece of identification information about the terminal device 1. Each terminal device 1 includes identification information, such as an IP address, a MAC address, and IMSI information, and may provide the identification information to the service server 100 when communicating with the service server 100. Accordingly, the service server 100 may store scroll log information for each piece of identification information about the terminal device 1 instead of a user account.

In addition, the service server 100 may learn the scroll log information using machine learning and may analyze a pattern of a scroll input performed by each user when browsing through the content. For example, when the content is a series, the service server may distinguish a user browsing through a new episode immediately after releasing the new episode and users browsing through episodes at once a certain time after releasing the episodes through the pattern of the scroll input and may perform inclination analysis of the users. Further, when the content, such as a webtoon, includes cuts including a special effect, such as a video, the service server 100 can analyze the concentration level of a user by comparing display duration in the cuts.

Further, a user that performs unauthorized copying of the content intends to capture an image or record a video such that each image is clearly shown and may thus stop scrolling at different positions or time intervals from those of normal users. Therefore, the service server 100 may extract a scroll input pattern of users that perform unauthorized copying through a pattern analysis of a scroll input.

Specifically, the service server 100 may collect scroll log information at the time of generating an unauthorized copy from a user account or a terminal device 1 detected to have generated the unauthorized copy and may perform machine learning using the collected scroll log information as a sample. Subsequently, the service server 100 may extract an unauthorized copy pattern corresponding to a scroll input performed when generating an unauthorized copy through machine learning.

In the unauthorized copy determination operation (S140), the service server 100 may determine whether content is copied without authorization by comparing the scroll log information with the unauthorized copy pattern. That is, the service server 100 may identify scroll log information applied by each user in real time or at a later time and may calculate the similarity between the scroll log information and an unauthorized copy pattern. Here, when the similarity is a set value or greater, the service server 100 may determine that a user has performed unauthorized copying, in which case the service server 100 may transmit a warning message for warning of unauthorized copying to the terminal device 1 or the user account. According to an embodiment, it is also possible to stop providing content for the terminal device 1 or the user account.

FIG. 7 is a flowchart illustrating a method for detecting unauthorized copying of content according to another embodiment of the present disclosure.

Referring to FIG. 7, the service server 100 may provide content including a plurality of images to a terminal device 1 (S210), may collect a scroll input that a user applies to the terminal device 1 when browsing through the content, and may generate scroll log information from the scroll input (S220). The service server 100 may construct a database by collecting each piece of generated scroll log information for each piece of identification information about the terminal device 1 or each user account registered in the service server 100 (S230).

An administrator of the service server 100 may collect unauthorized copies circulated online and may input the collected unauthorized copies to the service server 100. That is, the service server 100 may receive an unauthorized copy generated by capturing the content or recording the content as a video, may retrieve scroll log information corresponding to the unauthorized copy, and may extract a terminal device 1 or a user account that has generated the unauthorized copy (S240).

Figure 8A:
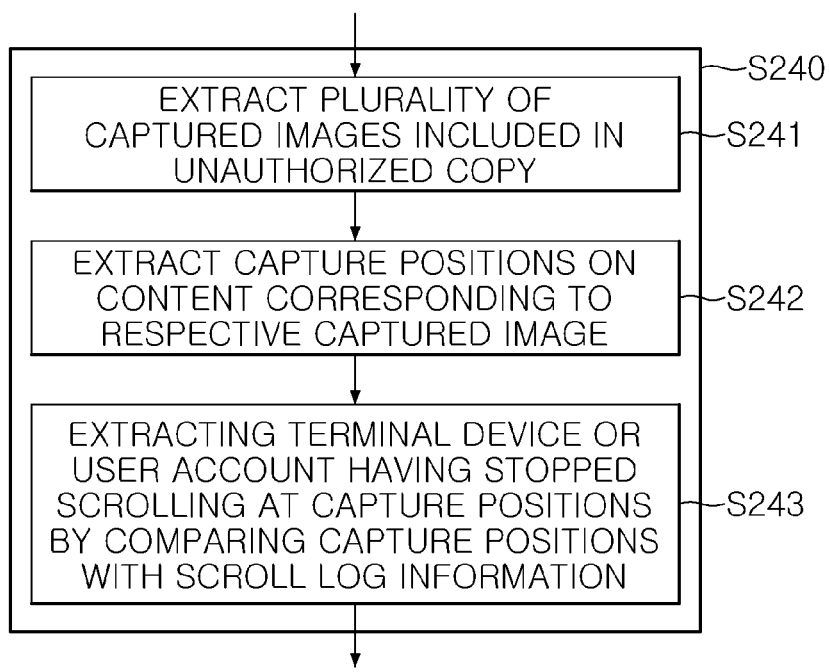

Specifically, referring to FIG. 8A, the service server 100 may extract a plurality of captured images included in the unauthorized copy (S241) and may extract capture positions corresponding to the respective captured image from the registered content (S242). Subsequently, the service server 100 may compare the capture positions with the scroll log information, thereby extracting a terminal device 1 or a user account having stopped scrolling at the capture positions (S243). Here, the service server 100 may extract a terminal device 1 or a user account having stopped scrolling at positions that match the capture positions corresponding to all of the captured images by a set percentage or greater. That is, since it cannot be considered as coincidence that capture positions and positions at which scrolling is stopped coincide with each other in 80 to 90% of all of the images, the service server 100 may determine the terminal device 1 or the user account as an unauthorized copier.

Figure 8B:
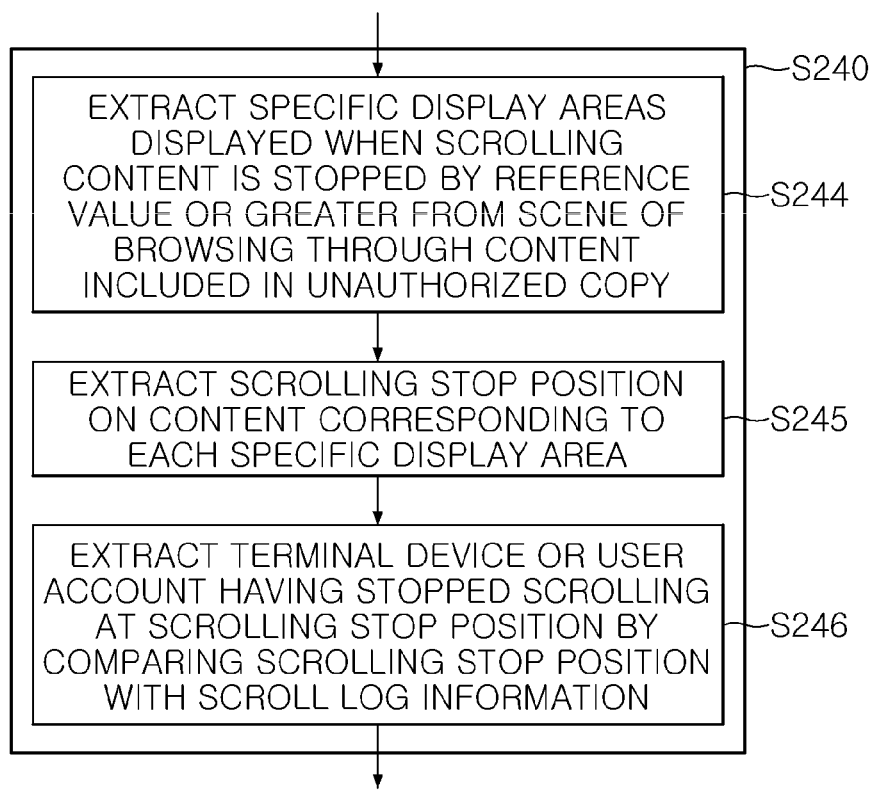

According to an embodiment, it is possible to generate an unauthorized copy by recording a scene while browsing through the content of a video. In this case, as illustrated in FIG. 8B, the service server 100 may first extract specific display areas displayed when the scrolling of the content is stopped by a reference value or greater from the scene of the content included in the unauthorized copy (S244). Subsequently, the service server 100 may extract a scrolling stop position on the content corresponding to each specific display area (S245), and may extract a terminal device 1 or a user account having stopped scrolling at the scrolling stop position by comparing the scrolling stop position with the scroll log information (S246). Here, the scrolling stop position may be expressed as position coordinate information on the content, and may also be expressed as a pixel coordinate value of the content according to an embodiment. Here, the service server 100 may extract a terminal device 1 or a user account having stopped scrolling at positions that match all scrolling stop positions of the video by a set percentage or greater.

The present disclosure described above can be realized as a computer-readable code in a medium recording a program. A computer-readable medium may keep storing a computer-executable program or may temporarily store the computer-executable program for execution or download. Further, the medium may include various recording devices or storage devices in a form in which a single piece or a plurality of pieces of hardware is combined and may be distributed on a network without being limited to a medium directly connected to a computer system. Examples of the medium may include those configured to store a program instruction including a magnetic medium, such as a hard disk, a floppy disk, and a magnetic tape, an optical recording medium, such as a CD-ROM and a DVD, a magneto-optical medium, such as a floptical disk, a ROM, a RAM, a flash memory, and the like. In addition, other examples of the medium may include the App Store that distributes applications, a site that supplies or distributes various types of software, and a recording medium or a storage medium managed by a server. Therefore, the above detailed description should not be construed as restrictive in all aspects and should be considered as illustrative. The scope of the present disclosure should be determined based on reasonable interpretation of the appended claims, and all changes and modifications within the equivalent scope of the present disclosure are included in the scope of the present disclosure.

The present disclosure is not limited to the embodiments described above and the appended drawings. It will be obvious to those skilled in the art to which the present disclosure pertains that a component according to the present disclosure described above can be substituted, modified, or changed within the spirit and scope of the present disclosure.

The invention claimed is:

1. A method performed by a service server for detecting unauthorized copying of content, the method comprising:

providing content including a plurality of images to a terminal device;

collecting a scroll input applied by a user to the terminal device when browsing through the content, and generating scroll log information from the scroll input; and constructing a database by collecting the scroll log information from the scroll input according to identification information of the terminal device or a user account registered in the service server.

2. The method of claim 1, further comprising extracting an unauthorized terminal device or an unauthorized user account generating an unauthorized copy of the content by retrieving scroll log information corresponding to the unauthorized copy from the database when the service server receives the unauthorized copy generated by capturing the content or recording a scene while browsing through the content as a video.

3. The method of claim 2, wherein the extracting of the unauthorized terminal device or the unauthorized user account comprises:

extracting a plurality of captured images included in the unauthorized copy;

extracting a capture position on the content corresponding to each captured image; and extracting the unauthorized terminal device or the unauthorized user account stopping scrolling at the capture position by comparing the capture position and the scroll log information.

4. The method of claim 2, wherein the extracting of the unauthorized terminal device or the unauthorized user account comprises:

extracting specific display areas displayed when a scrolling of the content is stopped by a reference value or greater from the scene of the content included in the unauthorized copy;

extracting a scrolling stop position on the content corresponding to each specific display area; and extracting the unauthorized terminal device or the unauthorized user account stopping scrolling at the scrolling stop position by comparing the scrolling stop position with the scroll log information.

5. The method of claim 1, wherein the content is a webtoon or a web novel formed by vertically connecting a plurality of images.

6. The method of claim 1, wherein the scroll log information comprises position coordinate information indicating a display area of the content displayed on the terminal device corresponding to the scroll input and display time information of the display area of the content on the terminal device.

7. The method of claim 6, wherein the generating the scroll log information comprises extracting a display area having a display duration in which a scrolling of the content remains stopped being a reference value or greater as an effective display area and generating the scroll log information including the position coordinate information and the display time information of the effective display area.

8. The method of claim 6, wherein, when the content supports vertical scrolling, the position coordinate information includes an uppermost coordinate value and a lowermost coordinate value of the display area, and the display time information includes at least one of a display start time, a display end time, and a display duration of the display area.

9. The method of claim 6, wherein the scroll log information further comprises at least one of content identification information indicating the content and a unique number of an image displayed in the display area.

10. The method of claim 1, wherein the constructing of the database comprises learning the scroll log information using machine learning and analyzing a pattern of the scroll input performed when browsing through the content.

11. The method of claim 1, wherein the constructing of the database comprises performing machine learning of sample scroll log information corresponding to an unauthorized copy generated by capturing the content and extracting an unauthorized copy pattern corresponding to a scroll input performed when generating the unauthorized copy.

12. The method of claim 11, further comprising determining whether the content is copied without authorization by comparing the scroll log information with the unauthorized copy pattern.

13. The method of claim 12, wherein the determining of whether the content is copied without authorization comprises transmitting a warning message to the terminal device or the user account or stopping providing the content when it is determined that the content is copied without authorization.

14. A non-transitory computer readable recording medium storing a computer program for instructing a computer to perform the method for detecting unauthorized copying of content as defined in claim 1.

15. A service server comprising:

a content providing unit configured to provide content including a plurality of images to a terminal device;

a scroll log information generation unit configured to collect a scroll input applied by a user to the terminal device when browsing through the content and to generate scroll log information from the scroll input; and a storage unit configured to collect and store the scroll log information according to identification information of the terminal device or a user account registered in the service server.

* * * * *